United States Patent [19]

Heritage et al.

[11] Patent Number: 4,746,193

[45] Date of Patent: May 24, 1988

[54] APPARATUS FOR STABILIZATION OF HIGH SPEED OPTICAL PULSES

[75] Inventors: Jonathan P. Heritage, Red Bank; Andrew M. Weiner, Eatontown, both of N.J.

[73] Assignee: Bell Communications Research, Inc., Livingston, N.J.

[21] Appl. No.: 936,488

[22] Filed: Nov. 26, 1986

[51] Int. Cl.[4] ............................................. G02B 27/46
[52] U.S. Cl. ........................ 350/162.12; 350/162.17; 350/168
[58] Field of Search ...................... 350/162.12, 162.17, 350/168

[56] References Cited

PUBLICATIONS

"Optical Pulse Shaping with a Grating Pair", *Applied Optics*, J. Agostinelli, et al., vol. 18, No. 14, 15, Jul. 1979, pp. 2500-2504.

*Primary Examiner*—Bruce Y. Arnold
*Attorney, Agent, or Firm*—James W. Falk

[57] ABSTRACT

An optical system including an input pulse source for providing an input optical pulse the intensity of which is sufficiently high to result in stimulated Raman scattering; and a first optical component that spatially disperse the frequency components of the input optical pulse to produce a dispersed beam. A bandpass filter is disposed asymmetrically in the path of the dispersed beam to produce a modified dispersed beam; and a second optical component is disposed in the path of the modified dispersed beam to return the frequency components substantially to the spatially distribution of the input optical pulse.

18 Claims, 3 Drawing Sheets

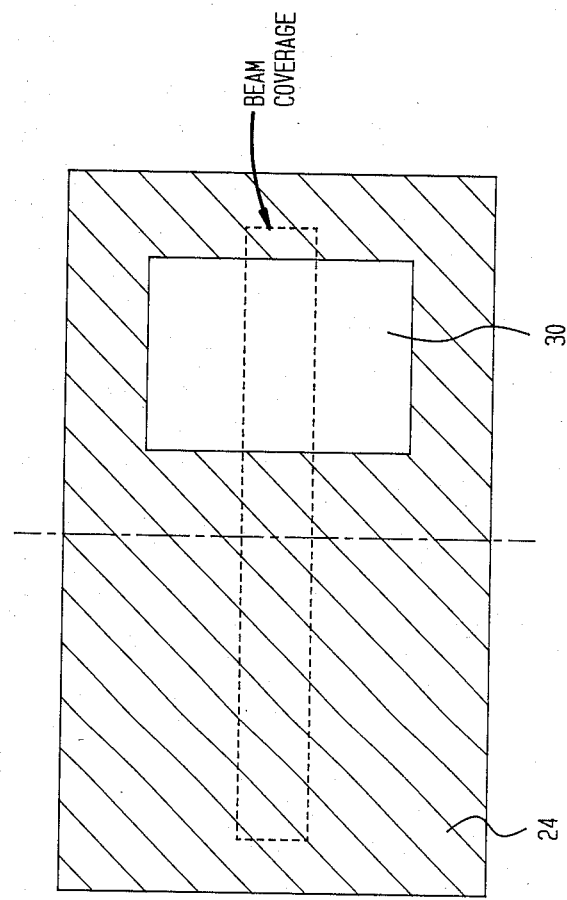

APPARATUS FOR STABILIZATION OF HIGH SPEED OPTICAL PULSES

BACKGROUND OF THE INVENTION

1. Field of the Invention

The invention relates to optical systems, and in particular to apparatus for stabilizing the shape and energy of optical pulses.

2. Description of the Prior Art

Various types of optical systems employing optical pulse signals are known in the prior art. High speed optical computing and communication systems require precisely defined pulses. Experimental systems require pulses on the picosecond to nanosecond time scale with specific temporal intensity profiles for triggering, coding, and analysis.

Several approaches to pulse shaping have been proposed in the prior art that generally use either active or passive shaping techniques. Active pulse shaping techniques include electrooptic deflectors and Pockels cells. Passive pulse-shaping techniques include mirror stackers, etalon stackers, intensity dependent filters, flat lens shapers, nonlinear interferometers, birefringent filters and double-grating pulse shaping systems.

In particular, an article entitled "Optical Pulse Shaping With a Grating Pair" by J. Agostinelli, G. Harvey, T. Stone and C. Gabel in *Applied Optics*, Vol. 18, No. 14, 15 July 1979, pp. 2500-2504 discloses the concept of a passive pulse-shaping system that uses a pair of diffraction gratings along with various filters of amplitude and/or phase type to alter the temporal and/or instantaneous spectral profile of the input pulse. Amplitude filters will attenuate certain spectral components and therefore certain portions of the temporal profile of the input pulse will be attenuated. Phase filters will shift various groups of spectral components in time.

As shown in the article, an unshaped input pulse enters the system by impinging upon a first diffraction grating. The diffracted beam emerges as a diverging fan of rays due to the bandwidth of the input pulse and the dispersive nature of the grating. The diverging beam then impinges upon a second diffraction grating of identical groove spacing as the first grating. The angles of the two gratings are precisely matched, so that after the second diffraction, the rays emerge parallel to the input ray direction. A mirror is set perpendicular to the beam emerging from the second grating in order to reflect light back through the pair of diffraction gratings, with each ray retracing its steps, so that a collimated beam emerges at the output of the system in the opposite direction of the incident beam.

Each spectral component of the input pulse traverses a different distance in passage through this system. However, due to the negatively dispersive nature of the grating pair, high frequency components of the input pulse emerge prior to the lower frequency components.

In the plane of the mirror, called the filter plane, there is both spatial and temporal transposition of the spectral components of the input pulse. Amplitude filters are inserted in the "filter plane" to attenuate certain spectral components and therefore attenuate certain portions of the temporal profile of the output pulse. Phase filters are inserted to shift various groups of spectral components in time.

Further, the article discloses the use of various opaque strips placed at various places in the "filter plane" to alter the shape of the output pulse and the use of a plate having a continuously varying transmission function to produce a linearly ramped output pulse.

Unfortunately, the output pulse from the system shown in the article is linearly frequency modulated, "as predicted by linear systems theory (the Fresnel transform of a band-limited Gaussian is a wider Gaussian with linear FM)". Furthermore, the output pulse is not transform-limited, i.e., the output pulse has more spectral width than is necessary to support the features of the shape of the intensity profile, and it is necessarily longer than the input pulse. Since a transform-limited pulse will propagate a greater distance in an optical fiber than a non-transform-limited pulse before being distorted by dispersion of the group velocity, such a configuration is a substantial drawback in using output pulses from the system disclosed in the article in optical digital communications systems.

Another approach to pulse shaping is described in our U.S. Pat. No. 4,655,547 and assigned to the assignee of the present application. In that optical system, an input optical pulse is chirped, and the chirped pulse is then passed through an optical component that spatially disperses the frequency components of the chirped pulse and partially compensates the chirp.

The spatially dispersed frequency components are then passed through spatial amplitude and/or phase masks that control and/or adjust the amplitude and/or phase of the frequency components. Finally, the masked components are passed through the first or a second optical component that returns the masked, spatially dispersed frequency components substantially to the spatial distribution of the input pulse while substantially completing the compensation of the chirp to form an output pulse.

Although such an optical system permits the creation of very short pulses useful in high speed optical digital communications, there are frequently fluctuations in the width, shape, and energy of pulses formed by such optical systems. Such noise places a limit on the amount of information that may be communicated in such an optical system. Prior to the present invention, there has not been a suitable technique for stabilizing very short optical pulses to the extent necessary for some optical communication system applications.

SUMMARY OF THE INVENTION

Briefly, and in general terms, the present invention provides an optical system including an input pulse source for providing an input optical pulse; and a first optical component that spatially disperses the frequency components of the input optical pulse to produce a dispersed beam. A bandpass filter is disposed asymmetrically in the path of said dispersed beam to produce a modified dispersed beam. A second optical component is disposed in the path of the modified dispersed beam to return the frequency components substantially to the spatial distribution of the input optical pulse. The intensity of the input optical pulse is sufficiently high to result in stimulated Raman scattering. More particularly, the conversion efficiency associated with the input optical pulse is preferred to be greater than 10%.

The present invention also provides a method for pulse stabilization by operating an input pulse source at sufficiently high energy to produce efficient stimulated Raman conversion, spatially dispersing the frequency components of the input optical pulse, filtering the dispersed beam, and returning the frequency components to the spatial distribution of the input optical pulse.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWING

FIG. 3 shows a top plan view of the mask used in the present invention.

To facilitate reader understanding, identical reference numerals are used to designate substantially similar elements common to the Figures.

DESCRIPTION OF THE PREFERRED EMBODIMENT

Figure 1:
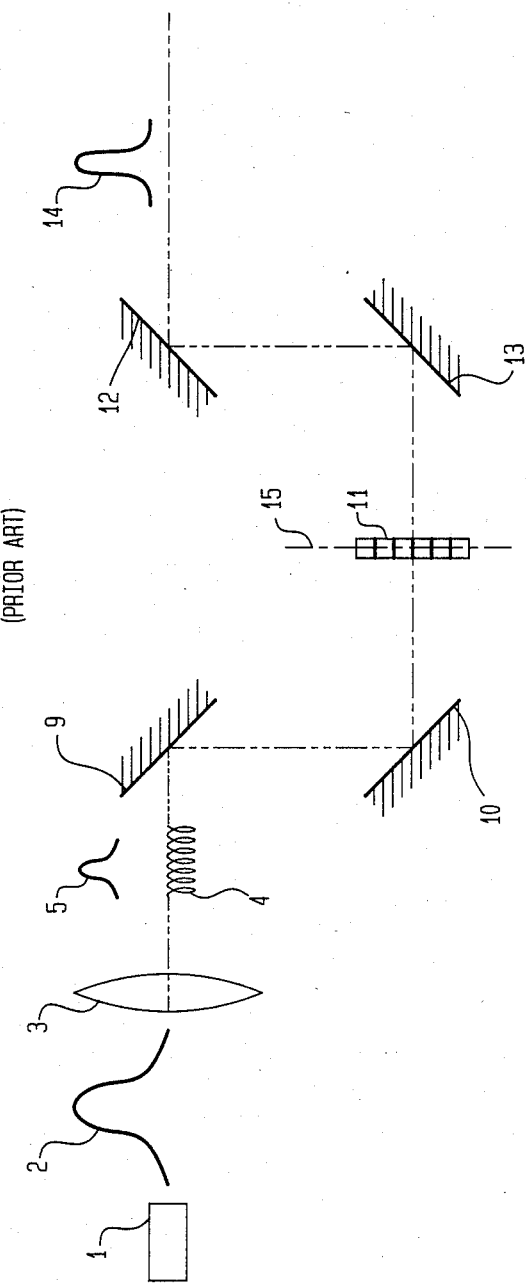
FIG. 1 shows a highly simplified pictorial representation of an optical system known in the prior art for pulse shaping.

Turning first to FIG. 1, there is shown a highly simplified pictorial representation of an optical system known from our previous work in pulse shaping. In particular, there is shown means for substantially linearly chirping an input optical pulse, a first optical component that spatially disperses the frequency components of the chirped pulse at a plane in the system and partially compensates the chirp, spatial amplitude and/or phase masks disposed to control and/or adjust the amplitude and/or phase of the spatially dispersed frequency components, and a second optical component that returns the frequency components substantially to the spatial distribution of the input pulse and substantially completes the compensation of the chirp. The resulting output pulse is substantially transform-limited since the optical system shown in FIG. 1 compensates the substantially linear chirp.

In FIG. 1, input pulse 2 is generated by laser 1. The pulse is focused by a lens 3 and propagated in a single-mode fiber 4 where chirped pulse 5 is produced by a nonlinear self-phase modulation interaction. Chirped pulse 5 impinges upon diffraction grating pair 9 and 10 which spatially disperses the spectral components of pulse 5 over the plane 15 indicated by the dotted line in the Figure. Mask 11, a spatial amplitude and/or phase mask, is positioned at plane 15 to intercept the spatially dispersed spectral components. After passage through mask 11, the spectral components impinge upon diffraction grating pair 12 and 13, which returns the frequency components substantially to the spatial distribution of input pulse 2. Grating pair 9 and 10 partially compensates for the chirp introduced by optical fiber 4 and grating pair 12 and 13 completes the chirp compensation.

The fluctuations in pulse energy and shape are an inherent limitation of such prior art pulse compression technology.

Because the temporal shape of a pulse is related to the frequency spectrum by a Fourier transform, control of the various frequency components allows manipulation of the temporal pulse shape itself, i.e., filtering in the frequency domain allows manipulation of temporal pulse shape. In the prior art, such manipulation is accomplished by adjusting the amplitude and/or phase of the frequency components after they have been spatially dispersed.

The spatial amplitude masks of the prior art may be fabricated from patterned opaque, partially transmitting, or reflecting films. Phase masks may be fabricated from patterned transparent or partially transparent dielectric media. Furthermore, masks can be fabricated which comprise combinations of spatial and amplitude masks. In addition, for ease of fabrication, masks can be formed directly on the turn-around mirror, if one is used.

An advantage of using a nonlinear interaction to produce the chirp, is that the frequency spectrum of the input pulse is enlarged and the resulting output pulses can be compressed. This compression phenomenon is described in an article entitled "80× Single-Stage Compression of Frequency Doubled Nd:Yttrium Aluminum Garnet Laser Pulses" by A. M. Johnson, R. H. Stolen, and W. M. Simpson in *Applied Physics Letters*, 44(8), Apr. 15 1984, pp. 729–731. This article notes that optical pulse compression utilizing self-phase modulation (SPM) to chirp the pulse in a single-mode fiber followed by a grating-pair dispersive delay line has been very successful in compressing dye laser pulses.

However, self-phase modulation in single-mode fibers in the absence of group velocity dispersion produces a frequency sweep (chirp) across the pulse that is linear only in the center of the pulse. Since a grating pair is a matched filter for a linear frequency sweep, parts of a pulse with a nonlinear chirp remain in the output pulse. This situation is not as severe in fibers with group velocity dispersion because the GVD tends to linearize the chirp over more of the pulse. For a particular input pulse length, peak power, wavelength, and fiber core area, a maximally linear chirp occurs, however, for only one fiber length. This optimal length varies as $t_O^2/P$ where $t_O$ and P are the input pulsewidth and peak power. For input pulsewidths in the range between 100 fsec and 100 psec and a 600 nm wavelength, optimal fiber lengths are between about 1 cm and 10 km. Since GVD decreases as the wavelength approaches the dispersion minimum of fibers near 1.3 microns, optimal lengths can become even longer.

Although the input pulses may be chirped by means of an active interaction, embodiments of the present invention also operate on pulses that have been passively chirped, such as by passive GVD in optical fibers or by dispersion in integrated optic waveguides or by bulk dispersive material waveguides and so forth. When passive chirping is used, however, no new frequency components are added to the input pulses, and the output pulses cannot be shorter than the input.

In our previous work shown in FIG. 1, the optical components utilize diffraction gratings and therefore have a negative dispersion. Such embodiments require positively chirped pulses in order to produce unchirped output pulses. In the visible region of the spectrum most glasses and other transparent media have positive group velocity dispersion.

Figure 2:
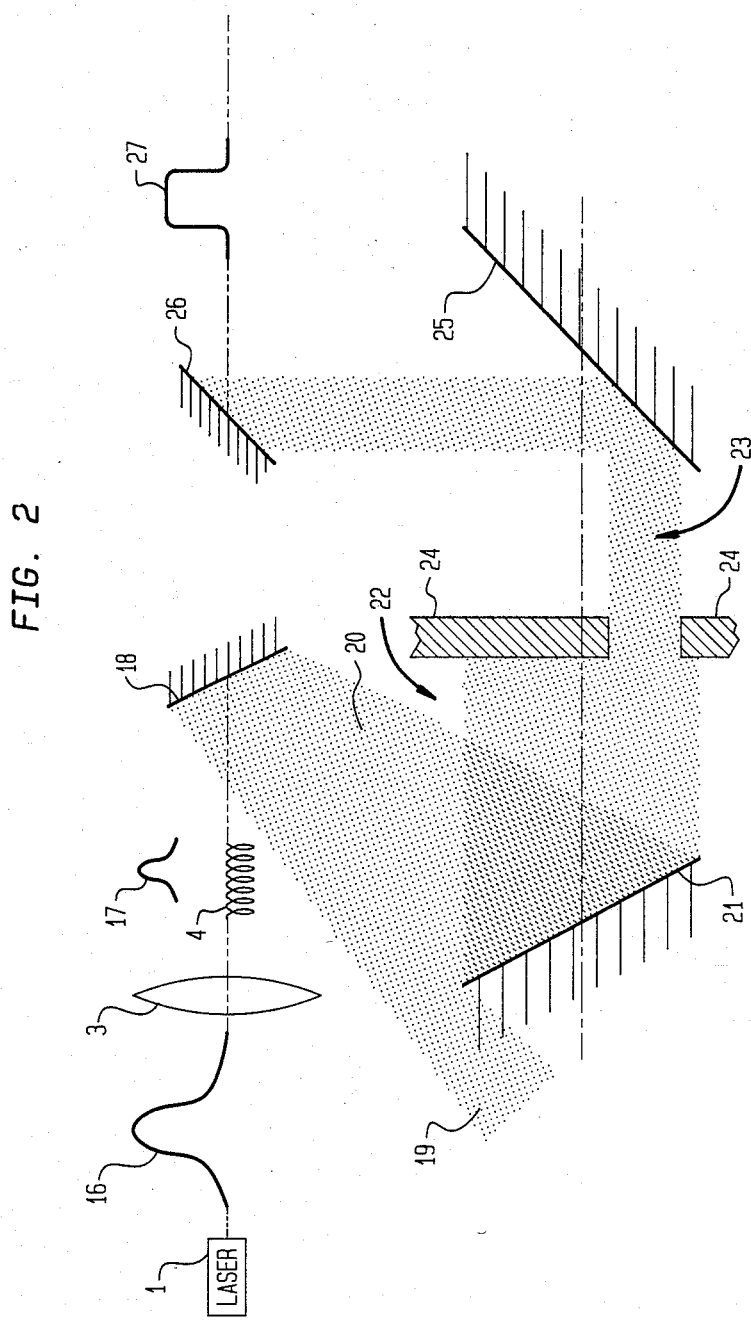
FIG. 2 shows a highly simplified pictorial representation of an optical system that depicts an embodiment of the present invention.

Turning next to FIG. 2, there is shown a highly simplified pictorial representation of an optical system that depicts an embodiment of the apparatus and method according to present invention. In general, there is shown a laser 1 which generates a pulse 16 or sequence of pulses according to the intended application. In contrast to configurations of the prior art, the pulse 16 is of sufficiently high intensity to result in stimulated Raman scattering. The pulse is focused by a lens 3 into one end of a fiber 4 resulting in the emitted enhanced pulse 17 from the other end of the fiber. We used the term "enhanced" to suggest the presence of additional spectral components arising from the Raman generation. A key feature of the present invention is the selection of an appropriate initial pulse intensity in combination with a suitable fiber length and optical characteristics to permit high Raman conversion efficiency, e.g. efficiency greater than 10%. It should be noted that some prior art specifically teaches away from the use of stimulated, Raman scattering for pulse generation. For example, the paper "Spectral and Temporal Study of Picosecond-Pulse Propagation in a Single-Mode Fibre," *Appl. Phys.* B 39, 43–46 (1986) by A. S. L. Gomes, et al. describes an investigation into compressed pulse quality in the presence of stimulated Raman scattering. They conclude that the shortest and most stable compressed pulses are obtained when there is little Raman scattering present as evidenced by the maximum symmetrical frequency broadening. On the other hand, the present invention teaches how to obtain ever greater stability by deliberately coupling so much power into the fiber that the Raman scattering produces an extremely asymmetric spectrum.

The emitted pulse 17 is directed to a first optical component that spatially disperses the frequency components of the pulse to produce a dispersed beam. In the preferred embodiment according to the present invention, the optical component consists of a pair of diffraction gratings 18 and 21. As seen in the figure, a portion 19 of the beam 20 reflected from the first grating 18 is widely dispersed—such portion representing spectral components arising from Raman generation—and is not even incident on the second grating 21. The dispersed beam 22 reflected from grating 21 is directed to a filter 24 which in the preferred embodiment is a bandpass filter disposed asymmetrically in the path of the dispersed beam 22 to produce a modified dispersed beam 23. A second optical component is disposed in the path of the modified beam 23 for returning the frequency components substantially to the spatial distribution of the original pulse. In the preferred embodiment, the second optical component consists of a pair of diffraction gratings 25 and 26, which produces output pulse 27.

It should be clear to those skilled in the art that use of the term optical component herein refers to components of any sort that operate on optical pulses.

We describe an embodiment of the present invention wherein the means for chirping the input optical wave provide a substantially linearly chirped pulse. The output pulse is substantially transform-limited when the apparatus constructed according to the present invention compensates the substantially linear chirp.

The means for substantially linearly chirping the input pulse, in one embodiment, is an optical fiber in which the chirp is produced by a nonlinear interaction, e.g. self-phase modulation (SPM), between the fiber and the input light pulse. In this embodiment, the output pulses can be shorter than the input pulses because the nonlinear interaction has increased the spectrum of the input pulses.

The means for substantially linearly chirping the input pulse, in another embodiment, is an optical fiber in which the chirp is produced by a linear interaction, e.g. group velocity dispersion (GVD). In this embodiment, the output pulses can only be as short as the input pulses because no spectrum has been added to the input pulse.

In order that the spatially dispersed frequency components are substantially brought together in space, both transverse to and along the propagation direction of the output pulse, the time dispersion of the optical components must be of the correct sign, amplitude and shape. This can be achieved in many forms. An optical component may comprise a pair of diffraction gratings, a diffraction grating with two mirrors, a pair of prisms, or a prism with two mirrors and so forth. Two pairs of diffraction gratings are used in the preferred embodiment solely by way of illustration and are spaced apart less than half of the normal distance which diffraction gratings are spaced, where "normal" refers to a spacing such as the spacing in FIG. 1 or in similar configuration of the prior art, and is known to those skilled in the optical art. Such shorter than normal spacing is necessary to accommodate the Raman spectra.

In more specific detail, in the preferred embodiment the input pulse or pulse train 16 is generated by CW Nd:YAG laser 1 operating at the fundamental period with second harmonic mode locking. Pulses 16 were 80 psec in duration with a peak power of approximately 60 watts and a repetition period of 10 nsec. These pulses were launched through lens system 3 into silicon core, 7.3 micron diameter single-mode, polarization-preserving fiber 4, having an index of refraction difference between the core and the cladding of 0.0054, and 2 db/km loss. Fiber 4 was approximately 400 meters in length. The cladding structure of fiber 4 was designed to suppress higher order modes. The action of the nonlinear refractive index and the intensity profile of pulses 16 produced chirped pulses 17. The spectrum of chirped pulses 17 was broadened by a factor as much as 100 times the spectrum of input pulses 16. Chirped pulses 17 were then collected from the output end of fiber 4 and telescoped to a diameter of several millimeters by a lens (not shown) to become incident on the diffraction grating 18.

FIG. 3 shows a plan view of the bandpass filter 24. Bypass filter 24 is a patterned opaque film preferably with a single aperture 30 which is asymmetrically positioned with respect to the beam coverage shown by a dotted line in the Figure.

The single mode fiber is preferred over bulk material as the medium which provides the necessary nonlinear response for pulse compression by a grating pair. The introduction of the fiber is a significant improvement over bulk material because the self-phase modulation produced in a fiber is spatially uniform and because self-focusing is avoided. Despite these advances a significant problem plagues pulse compression, preventing the technique from becoming more than a laboratory tool. That problem is instability. The difficulty in producing a successful commercial pulse compressor is certainly tied, in part, to these intrinsic instabilities. Pulse energy fluctuations, shape fluctuations and, in general, fluctuation of the complex field spectra are severe. The origins of the instability are traceable to laser fluctuations which lead to fluctuations in the chirp amplitude and then to severe compressed pulse fluctuations arising from the requirement of precisely compensating the fluctuating chirp with a fixed time dispersion of the grating compressor.

The apparatus according to the present inventions eliminates fluctuations in pulse compression. There are four significant features in the present inventions. (1)

The input pulse to fiber must be powerful enough to produce efficient stimulated Raman conversion. (2) An asymmetric bandpass filter must be introduced at a focal plane near the second grating of a grating pulse compressor. (3) The compressor length must be significantly shorter than that predicted by the W. J. Tomlinson, R. H. Stolen, C. V. Shank, "Compression of Optical Pulses Chirped by Self-Phase Modulation in Fibers", *J. Opt. Soc. America*, B Vol. 1, pp. 139–149, 1984, theory that has previously been experimentally verified. (4) The fiber length must be approximately equal to or greater in length than the walk off length between the pump pulse and the Raman shifted pulse.

All of these conditions may be readily implemented. The underlying physical phenomena that is being exploited by the application of these four conditions is clamping of the input energy by efficient stimulated Raman scattering. In a few words, any increase in input power results only in an increase in the power of the Raman shifted light and not in the energy of the pump pulse that exits the fiber.

This fact explains condition 1 stated above. The bandpass filter (condition 2), is the key element of the present invention. The bandpass filter selects the red (blue) shifted spectral components for positive (negative) fiber dispersion, rejecting the blue (red) shifted components. The self-phase modulation power spectrum generated for strong Raman conversion is asymmetric, the spectrum shifts further to the red (blue) and is reduced in amplitude. The red shifted frequencies have their origin in the leading edge of the pump pulse. The asymmetry is due to the preferential depletion of the leading edge by the more rapidly advancing Raman pulse. It is these frequencies only that experience the intensity clamping action of the Raman conversion. The other half of the spectrum fluctuate because the Raman effect is negligible.

The preferential depletion of the leading edge of the pump pulse leads to a wide spectral region of linear chirp on the red shifted side. The blue shifted side remains unaffected, its chirp parameter is smaller, as indicated by the smaller blue shift than red shift. Thus the entire pulse has two regions of linear chirp, one steep and stable, the other, shallow and noisy. The dividing line between the two regions is approximately at the pulse center. While each region is separately compressible, one (blue) compresses to a somewhat broad and noisy pulse with a pedestal and satellites, the other (red) compresses to a highly stable, high quality, pedestal and satellite free pulse that is much shorter than the other. Of course, the grating spacing required by each side will be different from each other and both will be, in general, shorter than what one might calculate by a naive application of the theory of Tomlinson noted above. The entire pulse is not compressible into a high quality pulse because the upper and lower frequencies are chirped at a different rate. Furthermore, while some fluctuation reduction might occur it is clear that the fluctuations from the high frequencies will be present and thus severely limit the magnitude of the reduction. It is thus clear that simple application of the conventional art will not produce the dramatic stabilization obtained with the technique herein disclosed.

This invention eliminates the fluctuations in the width, shape, and energy of pulses compressed by a fiber and grating pulse compressor. More generally, the complex field spectra is stabilized by this invention.

The stabilization is effective throughout the entire range of frequencies that together superimpose to form a coherent pulse of a pulse train, from slow fluctuations in amplitude and phase to the highest frequencies.

This advance will have significant impact on ultrashort pulse generation, manipulation and modulation where high stability is required. Stability is always a desirable property of an optical system, but it is especially important wherever a nonlinear optical effect is being exploited. Examples include all optical switches or optical processing elements that might be employed in future communications systems or optical computers. Other examples of potential applications include: (1) generation of seed pulses for very high energy (1-Joule and above) amplifier chains, (2) precision temporal measurements of voltage waveforms propagating through integrated circuits and devices, and (3) data transmission and multiplexing using codes based on frequency domain optical phase and amplitude modulation.

While the invention has been illustrated and described as embodied in an apparatus for stabilization of high speed optical pulses it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art, fairly constitutes essential characteristics of the generic or specific aspects of this invention, and, therefore, such adaptations should and are intended to be comprehended within the meaning and range of equivalence of the following claims.

What is claimed is:

1. A method of generating a high speed opticle pulse comprising the steps of:
   generating an optical pulse with a laser,
   focusing said optical pulse into an optical fiber so that stimulated Raman scattering occurs to produce an enchanced optical pulse,
   spatially dispersing the frequency components of the enhanced optical pulse to produce a dispersed beam in which the extent of spatial dispersion corresponds to the frequency of the frequency component;
   providing an asymmetrically patterned opaque film in the path of said dispersed beam at a focal plane of said dispersed beam to transmit only a portion of the frequency components of said beam, thereby producing a modified beam, and
   recombining the frequency components of said modified beam to substantially the same spatial distribution as said optical pulse.

2. A method as defined in claim 1 wherein said step of focusing said opticla pulse into an optical fiber results in a Raman conversion efficiency of greater than 10%.

3. A method as defined in claim 1, wherein said step of spatially dispersing the frequency components of the enhanced optical pulse utilizes a diffraction grating.

4. A method as defined in claim 1, wherein said step of providing a patterned opaque film consists of providing a film having a single asymmetrically placed aperture.

5. A method as defined in claim 1, wherein said step of recombining the frequency components of said modified beam utilizes a diffraction grating.

6. An optical system for pulse compression comprising:
- an input pulse source for providing an input optical pulse having an intensity sufficiently high to result in stimulated Raman scattering;
- first optical component means for spatially dispersing the frequency components of the input optical pulse to produce a dispersed beam;
- a patterned opaque filter having an aperture asymmetrically disposed in the path of said dispersed beam to transmit a portion of the spatially dispersed frequency components of the dispersed beam thereby producing a modified dispersed beam; and
- second optical component means disposed in the path of said modified dispersed beam for returning the frequency components substantially to the spatial distribution of said input optical pulse, thereby substantially eliminating the fluctuations arising from pulse compression.

7. An optical system as defined in claim 6, wherein said first optical component means comprise a pair of diffraction gratings.

8. An optical system as defined in claim 7, wherein said pair of diffraction gratings are spaced apart less than half of the normal spacing between diffraction gratings.

9. An optical system as defined in claim 6 wherein said patterned opaque filter includes a single aperture asymmetrically disposed with respect to the beam coverage.

10. An optical system as defined in claim 6, wherein said second optical component means comprise a pair of diffraction gratings.

11. An optical system as defined in claim 10, wherein said diffraction gratings are spaced less than half of the normal spacing between diffraction gratings.

12. An opticle system as defined in claim 10, further comprising chirping means disposed in the path of said input optical pulse for producing a chirp or frequency sweep of the input optical pulse.

13. An optical system as defined in claim 12, wherein said chirp is produced by linear group velocity dispersion.

14. An optical system as defined in claim 12, wherein said chirping means comprises an optical fiber having a non-linear self-phase modulation interaction mechanism.

15. An optical system as defined in claim 14, wherein said optical fiber has a length equal to or greater than the walk off length between the input optical pulse and the Raman shifted pulse traveling in said optical fiber.

16. An optical system as defined in claim 14, wherein said optical fiber is approximately 400 meters in length.

17. An optical system as defined in claim 14, wherein said optical fiber is a single-mode, polarization-preserving fiber.

18. An optical system as defined in claim 14, wherein for positive fiber dispersion, said patterned opaque filter selects the red shifted spectral components of said dispersed beam.

* * * * *